United States Patent
Sun et al.

(10) Patent No.: US 7,734,492 B2
(45) Date of Patent: Jun. 8, 2010

(54) VALIDATION AND ANALYSIS OF JDF WORKFLOWS USING COLORED PETRI NETS

(75) Inventors: Tong Sun, Penfield, NY (US); Raju N. Gottumukkala, Ruston, LA (US); Michael David Shepherd, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1181 days.

(21) Appl. No.: 11/114,895

(22) Filed: Apr. 26, 2005

(65) Prior Publication Data

US 2006/0242002 A1    Oct. 26, 2006

(51) Int. Cl.
G06F 9/46    (2006.01)
(52) U.S. Cl. ............... 705/8; 706/50; 358/1.15
(58) Field of Classification Search ........ None
See application file for complete search history.

(56) References Cited

U.S. PATENT DOCUMENTS

| | | | | |
|---|---|---|---|---|
| 5,107,332 A | * | 4/1992 | Chan | 358/518 |
| 5,257,363 A | * | 10/1993 | Shapiro et al. | 703/13 |
| 5,490,097 A | | 2/1996 | Swenson et al. | |
| 5,493,321 A | * | 2/1996 | Zwadlo | 347/131 |
| 5,774,661 A | * | 6/1998 | Chatterjee et al. | 709/203 |
| 6,067,357 A | * | 5/2000 | Kishinsky et al. | 379/265.02 |
| 6,256,598 B1 | * | 7/2001 | Park et al. | 703/2 |
| 6,308,224 B1 | * | 10/2001 | Leymann et al. | 719/310 |
| 6,327,362 B1 | * | 12/2001 | Hull et al. | 379/243 |
| 6,349,238 B1 | * | 2/2002 | Gabbita et al. | 700/101 |
| 6,546,364 B1 | * | 4/2003 | Smirnov et al. | 703/22 |
| 6,876,894 B1 | * | 4/2005 | Chen et al. | 700/100 |
| 6,930,790 B1 | * | 8/2005 | Forthoffer | 358/1.15 |
| 6,937,993 B1 | * | 8/2005 | Gabbita et al. | 705/8 |
| 6,943,915 B1 | * | 9/2005 | Teraue | 358/1.9 |
| 6,957,418 B2 | * | 10/2005 | Batcha et al. | 717/124 |
| 7,120,699 B2 | * | 10/2006 | Stork et al. | 709/239 |
| 7,234,140 B2 | * | 6/2007 | Dortmans | 718/100 |
| 7,275,039 B2 | * | 9/2007 | Setteducati | 705/8 |
| 7,327,481 B2 | * | 2/2008 | Such et al. | 358/1.15 |
| 7,369,918 B2 | * | 5/2008 | Cosgrove | 700/213 |
| 7,406,357 B2 | * | 7/2008 | Ocke et al. | 700/97 |
| 7,580,911 B2 | * | 8/2009 | Sun et al. | 706/50 |
| 2002/0145750 A1 | * | 10/2002 | Honda et al. | 358/1.15 |
| 2002/0181017 A1 | * | 12/2002 | Such et al. | 358/1.15 |
| 2003/0018512 A1 | * | 1/2003 | Dortmans | 705/9 |
| 2003/0036940 A1 | * | 2/2003 | Leymann et al. | 705/8 |

(Continued)

OTHER PUBLICATIONS

Nabil R. Adam, Vijayalakshmi Atluri and Wei-Kuang Huang "Modeling and Analysis of Workflows Using Petri Nets" Journal of Intelligent Information Systems, 10, 131-158 (1998).*

(Continued)

*Primary Examiner*—Romain Jeanty
*Assistant Examiner*—Gurkanwaljit Singh
(74) *Attorney, Agent, or Firm*—Fay Sharpe LLP

(57) ABSTRACT

A method and system for translating a JDF workflow into a colored Petri net representation. Once the workflow has been converted, the colored Petri net is validated and analyzed. This provides the ability to identify potential deadlock conditions within a JDF workflow. In addition, the model network can be used to simulate throughput and turnaround time of a workflow and the effects of resources arriving at various times.

9 Claims, 7 Drawing Sheets

U.S. PATENT DOCUMENTS

| | | | | |
|---|---|---|---|---|
| 2003/0055811 | A1* | 3/2003 | Stork et al. | 707/1 |
| 2003/0072031 | A1* | 4/2003 | Kuwata et al. | 358/1.15 |
| 2003/0144974 | A1* | 7/2003 | Chang et al. | 706/25 |
| 2003/0189724 | A1* | 10/2003 | Kloosterman et al. | 358/1.18 |
| 2004/0066527 | A1* | 4/2004 | Kloosterman et al. | 358/1.15 |
| 2004/0078258 | A1* | 4/2004 | Schulz et al. | 705/9 |
| 2004/0083448 | A1* | 4/2004 | Schulz et al. | 717/101 |

OTHER PUBLICATIONS

H.M.W. Verbeek; W.M.P. van der Aalst; Akhil Kumar "XRL/Woflan: Verification and Extensibility of an XML/Petri-Net-Based Language for Inter-Organizational Workflows" Information Technology and Management; Jan.-Apr. 2004; 5, 1-2; ABI/INFORM Global p. 65.*

"JDF Specification: Release 1.1" CIP4 Organization http://www.cip4.org.*

Khodakaram Salimifard, Mike Wright "Petri net-based modelling of Workflow systems: An Overview" European Journal of Operational Research 134 (2001): pp. 664-676.*

Julie Shaffer; James J Mauro; Chuck Gehman; Laura Gale "The print production process: All things digital" GATFWORLD; Jan./Feb. 2003; 15, 1; ProQuest Central p. 42.*

"Simulation as a tool for logistics management" by Van Der Zee, Durk-Jouke, Ph.D., Universiteit Twente (The Netherlands), 1997, 273 pages; AAT C543006.*

Mor Peleg, Iwei Yeh and Russ B. Altman "Modelling biological processes using workflow and Petri Net Models" Stanford Medical Informatics vol. 18 No. 6 (2002): pp. 825-837.*

Khodakaram Salimifard, Mike Wright "Modelling and Performance Analysis of Workflow Management Systems using Timed Hierarchical Coloured Petri Nets" Proceedings of ICEIS 2002, vol. 2, pp. 843-846, 2002.*

"Job Definition Format" Anonymous PrintAction; Jun. 2004; 34, 6; ProQuest Computing p. 27.*

H.M. Dortmans, L.J. Somers "Document Workflow Optimization" Proceedings 14th European Simulation Symposium (c) SCS Europe BVBA (2002).*

"Connecting the workflow chain" Anonymous American Printer; Sep. 2003; 231, 6; ABI/INFORM Global p. 18.*

"2001: The edge of reason" Printing World. Tonbridge: Jan 8, 2001. p. 38.*

Sayal, M. ; Casati, F. ; Dayal, U. ; Ming-Chien Shan "Integrating workflow management systems with business-to-business interaction standards" Proceedings of the 18$^{th}$ International Conference on Data Engineering (2002).*

Inheritance of Interorganizational Workflows to Enable Business-to-Business E-Commerce W.M.P. van der Aalst. Electronic Commerce Research. Boston: Jul. 2002. vol. 2, Iss. 3; p. 195.*

Loosely coupled interorganizational workflows: Modeling and analyzing workflows crossing organizational boundaries Wil van der Aalst. Information & Management. Amsterdam: Mar. 1, 2000. vol. 37, Iss. 2; p. 67.*

Sea Ling; Seng Wai Loke; , "Advanced Petri Nets for modelling mobile agent enabled interorganizational workflows," Engineering of Computer-Based Systems, 2002. Proceedings. Ninth Annual IEEE International Conference and Workshop on the , vol., no., pp. 245-252, 2002.*

Lenz, K.; , "Modeling interorganizational workflows with XML nets," System Sciences, 2001. Proceedings of the 34th Annual Hawaii International Conference on , vol., no., pp. 10 pp., Jan. 3-6, 2001.*

E-Alliance: A Negotiation Infrastructure for Virtual Alliances Stefania Castellani, Jean Marc Andreoli, Mihnea Bratu, Olivier Boissier, et al. Group Decision and Negotiation. Dordrecht: Mar. 2003. vol. 12, Iss. 2; p. 127.*

K. Jenson, "An Introduction to the Theoretical Aspects of Coloured Petri Nets," in J.W. de Bakker, W.P. de Roever, G. Rozenberg (eds), "A Decade of Concurrency, Lecture Notes in Computer Science," vol. 803, Springer-Verlag 1994, at 230-272.

J. Ezpeleta and J. Colom, "Automatic Synthesis of Colored Petri Nets for the Control of FMS," IEEE Transactions on Robotics and Automation, vol. 13, No. 3, Jun. 1997.

W. Kühn, "Simulation of the Production Chain by use of an XML-based Job Definition Format," Proceedings 14$^{th}$ European Simulation Symposium.

T. Murata, "Petri Nets: Properties, Analysis and Applications," Proceedings of the IEEE, vol. 77, No. 4, Apr. 1989 (New York) at 541-580.

K. Jensen, "A Brief Introduction to Coloured Petri Nets," Computer Science Department, University of Aarhus, Denmark.

L. M. Kristensen, et al., "The Practitioner's Guide to Coloured Petri Nets," CPN Group, Dept. of Computer Science, University of Aarhus, Denmark.

"Coloured Petri Nets," http://www.daimi.au.dk/CPnets/intro/.

R. Bastide, et al., "Formal Specification of CORBA Services: Experience and Lessons Learned," LIHS, Universite Toulouse, France.

* cited by examiner

VALIDATION AND ANALYSIS OF JDF WORKFLOWS USING COLORED PETRI NETS

BACKGROUND

Illustrated herein are embodiments of a method and system relating to the validation and analysis of JDF workflows using colored Petri nets. The embodiments disclosed herein find particular application in conjunction with workflows relating to printing jobs and will be described with particular reference thereto. However, it is to be appreciated that these embodiments are also amenable to other like applications.

Generally, a workflow represents a flow of work. In a business corporation, for example, suppose that one of the members of the corporation is going to purchase an article. First, the person prepares a purchase slip and then brings the purchase slip to the superior. The superior checks the purchase slip, stamps the approval, and sends the purchase slip to the accounting department. Based on the purchase slip, the accounting department orders the article. As seen in the above-mentioned workflow, the purchase slip flows from the person to the superior, and from the superior to the accounting department, thus advancing the workflow. Therefore, a workflow can be considered a sequence of tasks. A task can be further divided into sub-tasks. Tasks can be performed by persons as in the foregoing example, and can automatically be performed by computers as, for example, in a printing job.

Workflow-based businesses rely heavily on their ability to effectively compete in and control existing and emerging workflows. Given the heterogeneity of the space, integration of these heterogeneous distributed systems is a considerable challenge and is fast becoming a critical factor of success in business. In addition to the multiplicity of systems, customers are demanding customization and flexibility for their workflows. As a result, automation of the integration and deployment of workflows today means considerable competitive advantage. Effective modeling is a key part of an overall workflow automation strategy.

Current workflow modeling technologies and tools enable clever visualization and some analysis capability. However, their effectiveness relies heavily upon the idiosyncratic knowledge and expertise of the person doing the modeling. That is, it is a highly manual and cumbersome effort and yields results only as good as the intuition and skill of the particular modeler.

JDF (Job Definition Format) is an industry standard designed to simplify information exchange between different applications and systems in and around the graphic arts industry. JDF is published by the International Cooperation for the Integration of Processes in Prepress, Press and Postpress Organization (CIP4) and specifies the information required to complete a customer intended print job. It enables the integration of commercial and planning applications into the technical workflow. JDF is a comprehensive XML-based file format and proposed industry standard for end-to-end job ticket specifications combined with a message description standard and message interchange protocol.

Conceptually, JDF has three main functions. First, it provides a single common language that supports the lifecycle of a print job. Thus, JDF is often referred to as a "Job Ticket" language. The second function is to provide a command and control language for devices on the shop floor. This aspect of JDF is called the Job Messaging Format (JMF). JMF allows the controlling workflow system or MIS in a process-automated environment to tell devices to start and stop jobs, reorder the queue, etc. Finally, there is inherent in JDF a flexible methodology for constructing workflows and providing the command, control, and configuration of plant automation and job production. There is a fourth main function of automating the handshake, which is accomplished with the new device capabilities functionality.

Generally, the information in JDF is organized into nodes in a hierarchical tree of processes and resources that each process produces and consumes. An XML-based JDF job describes the status of processes and resources at a particular instance. An MIS (Management Information System) is responsible for estimating, tracking, controlling and monitoring the entire production workflow. There are MIS vendors (such as EFI, Hiflex, iWay to name a few) that have already offered MIS products with varying capabilities to analyze and estimate the JDF workflow. But these existing analysis and estimation capabilities are very limited in terms of verifying both syntactic and semantic correctness of JDF workflow, and also lacking a simulation-based estimation on JDF workflow cost and performance.

JDF allows XML-based description of all the processes needed to complete a print product, from job submission through prepress, press and post press. Each process is defined in terms of the consumed input resources and produced output resources. Resources produced by one process might be required by other processes, and processes are interconnected in a chain of processes to form a complete workflow. Processes may share resources and be interconnected in sequential, parallel, overlapping and iteration fashion. Because of the complexity of the workflows that could result within a JDF instance it becomes difficult to manually analyze the validity of the workflow and perform predictive assessments for various performances and cost metrics to provide crucial business process management capabilities for the print shop. Currently most of the tools use a discrete event simulation package to asses the JDF-based workflow, but do not provide features to verify the correctness of JDF-based workflows.

One graphical approach which has been developed for modeling and simulating systems exhibiting concurrency and asynchronicity is that of Petri nets. One reason Petri net representations are used is that they are also analyzable. A good discussion of the history and general principles of Petri nets is contained in, for example, T. Murata, "Petri Nets: Properties, Analysis and Applications," Proceedings of the IEEE, Vol. 77, No. 4, April 1989 (New York) at 541-580, and K. Jensen, "An Introduction to the Theoretical Aspects of Coloured Petri Nets," in J. W. de Bakker, W. P. de Roever, G. Rozenberg (eds), "A Decade of Concurrency, Lecture Notes in Computer Science," Vol. 803, Springer-Verlag 1994, at 230-272, both of which are hereby incorporated by reference.

Colored Petri nets (or CPNs) involve a formal modeling language that has Petri net based formal analysis with detailed and concise description of the model in programming languages. It is a graphical oriented language for design, specification, simulation and verification of systems. CPNs are, in particular, well-suited for systems that consist of a number of processes which communicate and synchronize. Typical examples of application areas are communication protocols, distributed systems, automated production systems, work flow analysis and VLSI (Very Large-Scale Integration) chips. A model could be analyzed with a reachability graph generated of the various available states from which various behavioral properties like deadlocks, livelocks, and boundedness of the model can be derived. Thus, for example, colored Petri nets have been used for controlling a large class of flexible manufacturing systems (FMS), as described in J. Ezpeleta and J. Colom, "Automatic Synthesis of Colored Petri Nets for the Control of FMS," IEEE Transactions on Robotics and Automation, Vol. 13, No. 3, June 1997, which is hereby incorporated by reference.

Some have used an intermediate process calculus whereby the language level constructs of embedded systems have been mapped to Petri nets for analyzing the concurrency behavior. Others have synthesized colored Petri nets by generating process plans and the manufacturing system layout for formal modeling and analysis of flexible manufacturing systems. Yet others have applied a version of Petri nets for a behavioral specification of CORBA (Common Object Request Broker Architecture) in IDL (Interface Definition Language). In addition Petri nets have been applied to model a wide variety of applications like VLSI designs, control systems, software engineering, and mechanical systems. Some of the current workflow languages are based on underlying process calculus. Microsoft's XLANG is based on pi-calculus. For instance, IBM's WSFL (Web Service Flow Language) is based on Petri net semantics.

U.S. patent application Ser. No. 10/836,298 filed Apr. 30, 2004, entitled "WORKFLOW AUTO GENERATION FROM USER CONSTRAINTS AND HIERARCHICAL DEPENDENCE GRAPHS FOR WORKFLOWS," by Tong Sun, et al., and hereby incorporated by reference for all it discloses, proposes a Hierarchical Dependence Graph for formal analysis of JDF workflows by using an extended DAG (directed acyclic graph). Based upon the graphic theory of DAG, this method allows a formal JDF workflow analysis on identifying the missing resources, the dangling process nodes in JDF and possible cyclic deadlock loop.

Thus, there is a need for an improved method and system for formal verification and analysis of a JDF-based workflow prior to execution semantic analysis in terms of all possible resource and process states, reachability, boundedness and liveliness analysis.

BRIEF DESCRIPTION

A method of assessing a workflow for a print job prior to execution is provided. The method comprises programmatically deriving the operational semantics of the workflow into a colored Petri net; analyzing the colored Petri net workflow to check for syntactic and semantic correctness of the workflow; and simulating the colored Petri net workflow for a plurality of performance metrics.

The method may also include parsing the JDF job to determine resources, processes and resource process links; associating colors to represent resources and resource attributes; obtaining the resource attribute values and binding functions from the JDF and capability descriptions for the JDF job; and generating the colored Petri net equivalent of resource attribute types, resource types, resource attribute values and processes.

A system for assessing a Job Definition Format (JDF) workflow prior to execution is also provided. The system comprises a JDF job; a JDF parser and graph generator; a JDF to colored Petri net transformer; a JDF and capability descriptions database; a color generator; and a colored Petri net analyzer.

A workflow validation and analysis system is also provided. The system includes derivation means operative to programmatically derive the operational semantics of the workflow into a colored Petri net; analyzing means operative to analyze the colored Petri net workflow to check for syntactic and semantic correctness of the workflow; and simulation means operative to simulate the colored Petri net workflow for a plurality of performance metrics, wherein the performance metrics include at least one of cost, throughput, turnaround time, efficiency, resource waiting time, and waste.

DETAILED DESCRIPTION

The embodiments presented herein describe a method of formal verification and analysis of a JDF-based workflow prior to execution. The embodiments include the use of a colored Petri net formalism that describes a model in programming language semantics and verifies the model using Petri nets formal semantics. In addition to formal analysis, the model could be simulated for cost and performance assessment.

Figure 1:
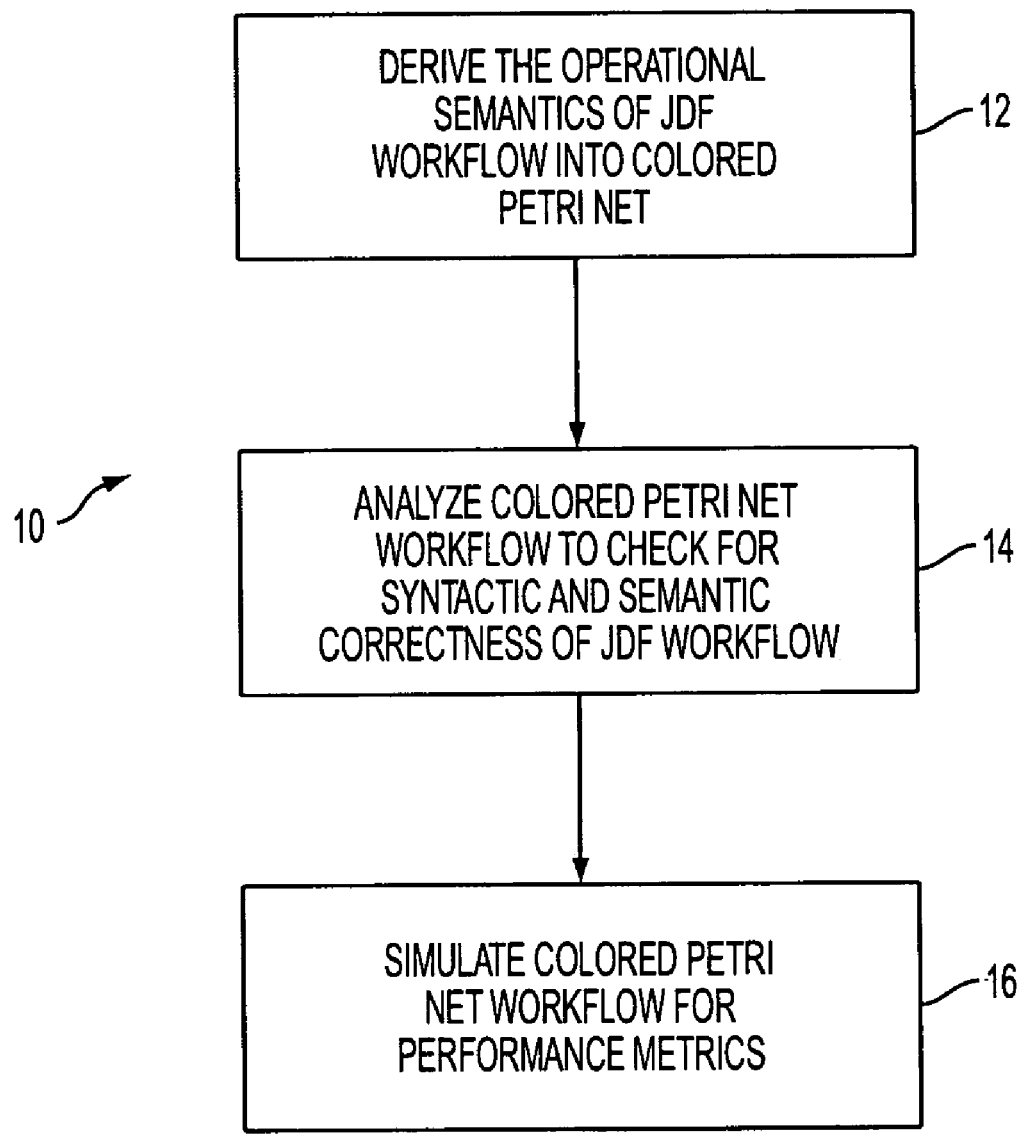
FIG. 1 is a flow chart of a method of assessing a JDF workflow prior to execution.

With reference now to FIG. 1, a method 10 of assessing a JDF workflow prior to execution is illustrated. First, the operational semantics of a JDF workflow into a colored Petri net are programmatically derived (12); second, the colored Petri net workflow is analyzed to check for syntactic and semantic correctness of the JDF workflow (14); and, third, the colored Petri net workflow is simulated for various performance metrics, such as cost, throughput and turnaround time (16).

To explain further, a JDF workflow generally consists of the following three core workflow-centric elements that affect the workflow description: (a) the JDF node, which specifies a process, group of processes or product intent, (b) the Resource, which describes the parameters that define the control and/or data for its associated process, and (c) the Resource Link, which binds a resource to a JDF node as an input or output.

The JDF scenario is generally described in XML, which consists of processes linked by resources via resource links. For each process, the resources that are consumed and the resources that are produced are determined by parsing the resource linkage and then an interconnection of various processes is obtained by the matching of valid processes which have similar resources.

The processes are arranged in an order based upon the sequence of processing. That is, the first node is the first process that has to be executed and the last node is the final node in the scenario. A process chain is obtained where processes are interconnected by resources. For example, any number of processes Pn may be connected sequentially as illustrated in FIG. 2.

Figure 2:
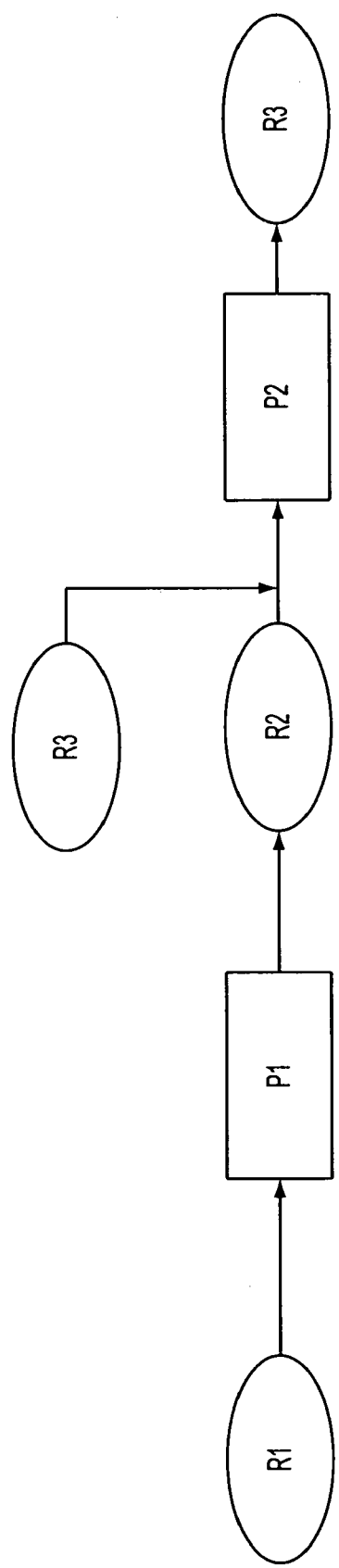
FIG. 2 is a block diagram illustrating processes connected sequentially.

In FIG. 2, a JDF root node N contains two process nodes P1 and P2. Process P1 has input resource R1 and output resource R2, while process P2 has input resources R2 and R3 and output resource R4. Thus, for example, in a JDF Workflow, the resources and processes in FIG. 2 could be assigned as follows: R1=Font, P1=Print, R2=A4 Paper, R3=Hardcover, P2=Finish, and R4=Book.

Figure 3:
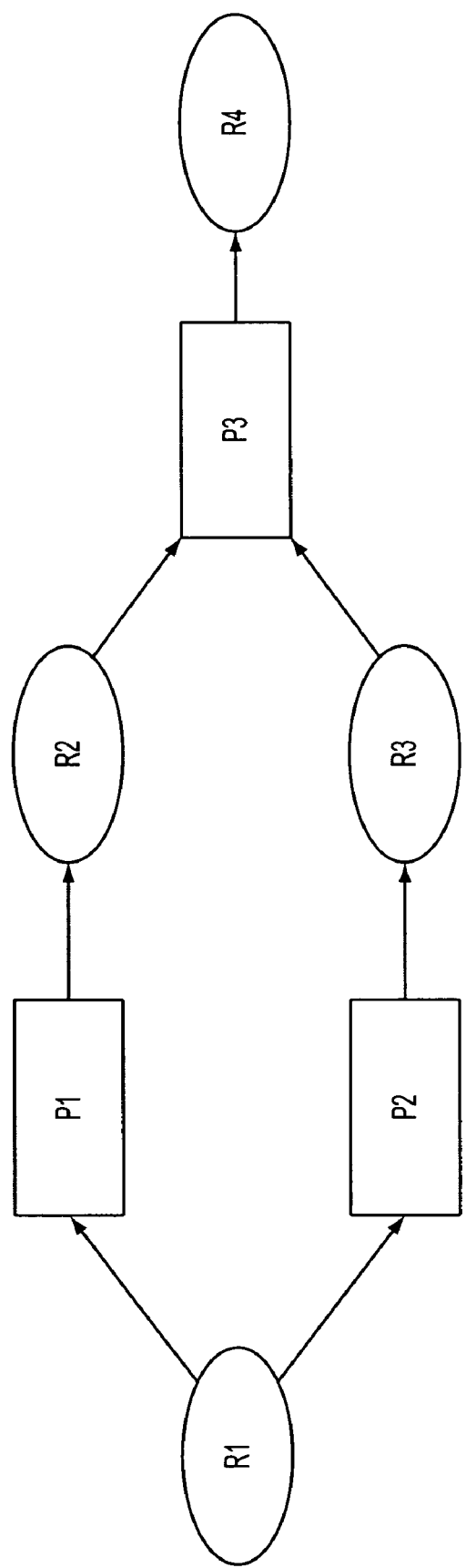
FIG. 3 is a block diagram illustrating processes connected in parallel fashion.

It is to be understood, however, that the processes Pn may be connected in various other arrangements. For example, FIG. 3 shows the processes P1, P2 and P3 of the JDF root node N connected in parallel, where process P1 has input resource R1 and output resource R2, process P2 has input resource R1 and output resource R3, and process P3 has input resources R2 and R3 and output resource R4.

Figure 4:
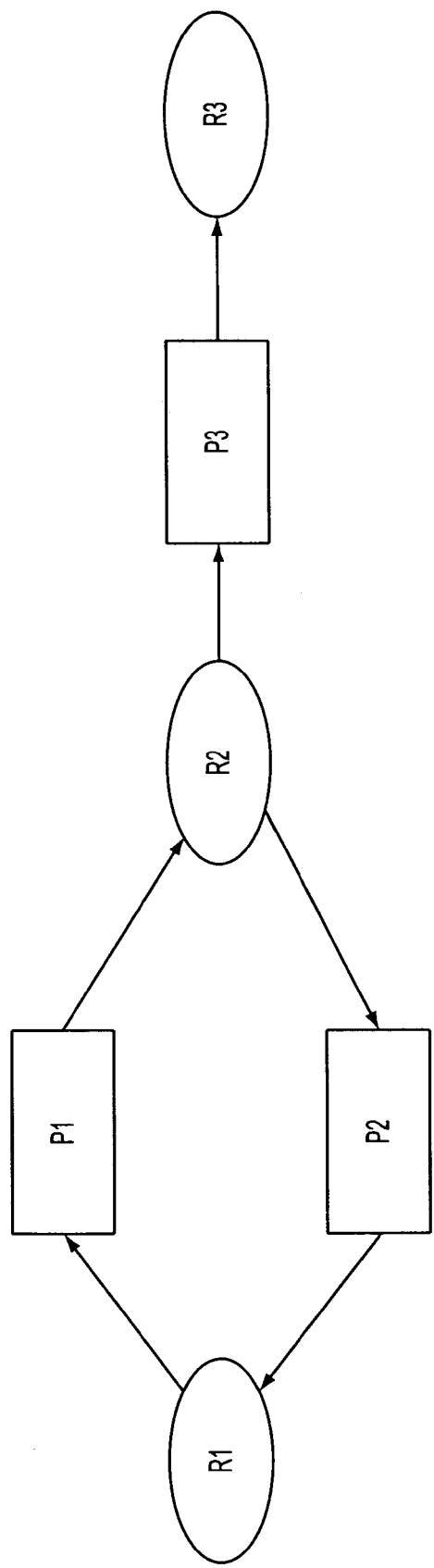
FIG. 4 is a block diagram illustrating processes connected in iterative fashion.

Further, FIG. 4 shows the processes P1, P2 and P3 of the JDF root node N connected in iteration, where process P1 has input resource R1 and output resource R2, process P2 has input resource R2 and output resource R1, and process P3 has input resource R2 and output resource R3.

A process tree may be generated, where the process tree consists of the processes specified in the JDF scenario. Each process is linked to the resources it produces and consumes. Resources contain resource attributes and attribute values. When a certain process output resource and another process input resources are matched, then they share the same resource and are determined to be connected. These process/resource linkages determine the resulting process tree.

Figure 5:
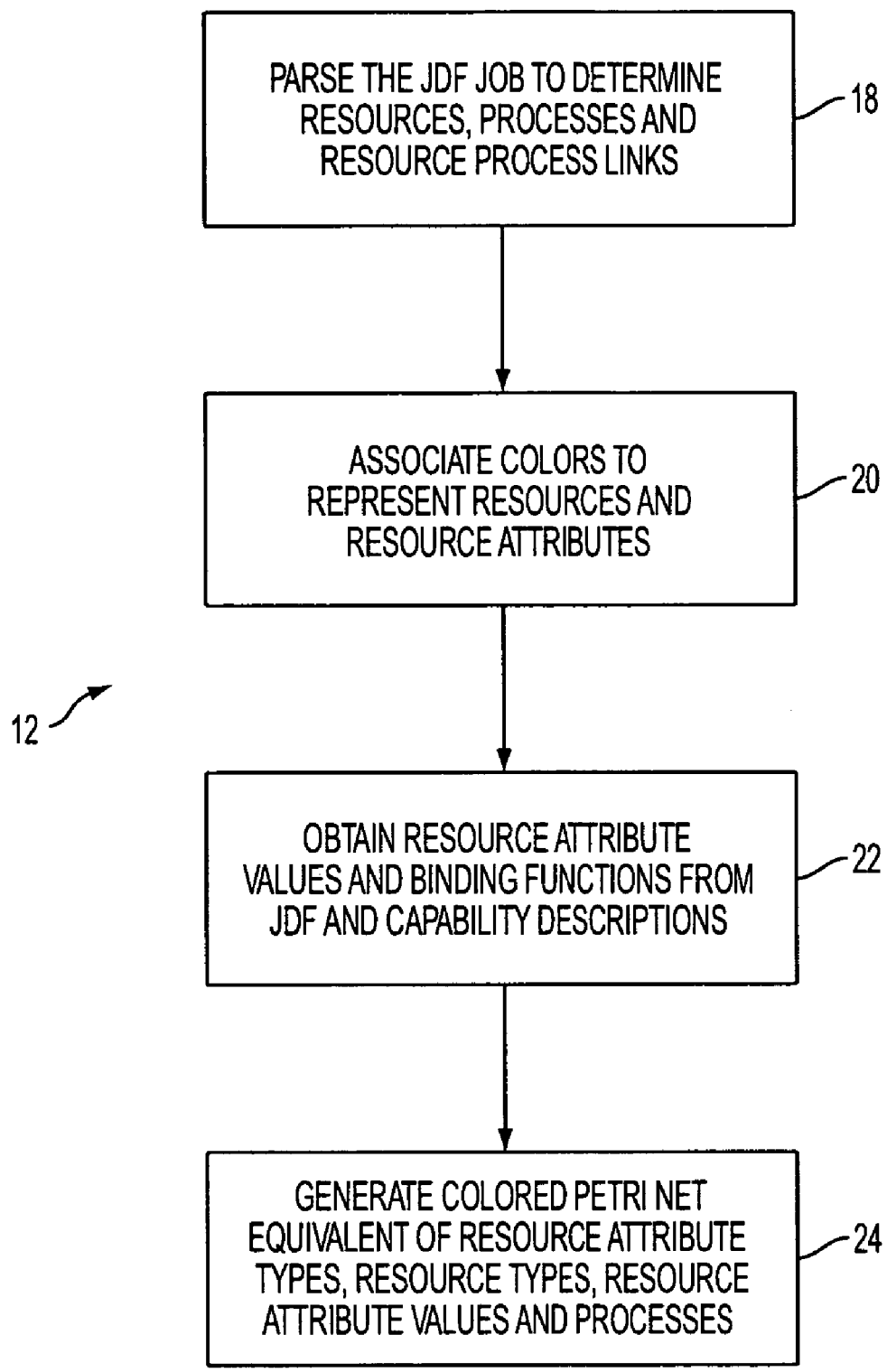
FIG. 5 is a flow chart of a method of transforming a sample JDF into a colored Petri net.

Deriving the operational semantics of a JDF workflow into a colored Petri net (12) may be accomplished by the method outlined in FIG. 5. First, the JDF job is parsed to determine resources, processes and resource process links (18). Second, colors are associated to represent resources and resource attributes (20). Third, resource attribute values and binding functions are obtained from JDF and capability descriptions stored in a knowledge database (22). Finally, the colored Petri net equivalent of resource attribute types, resource types, resource attribute values and processes are generated (24).

Figure 6:
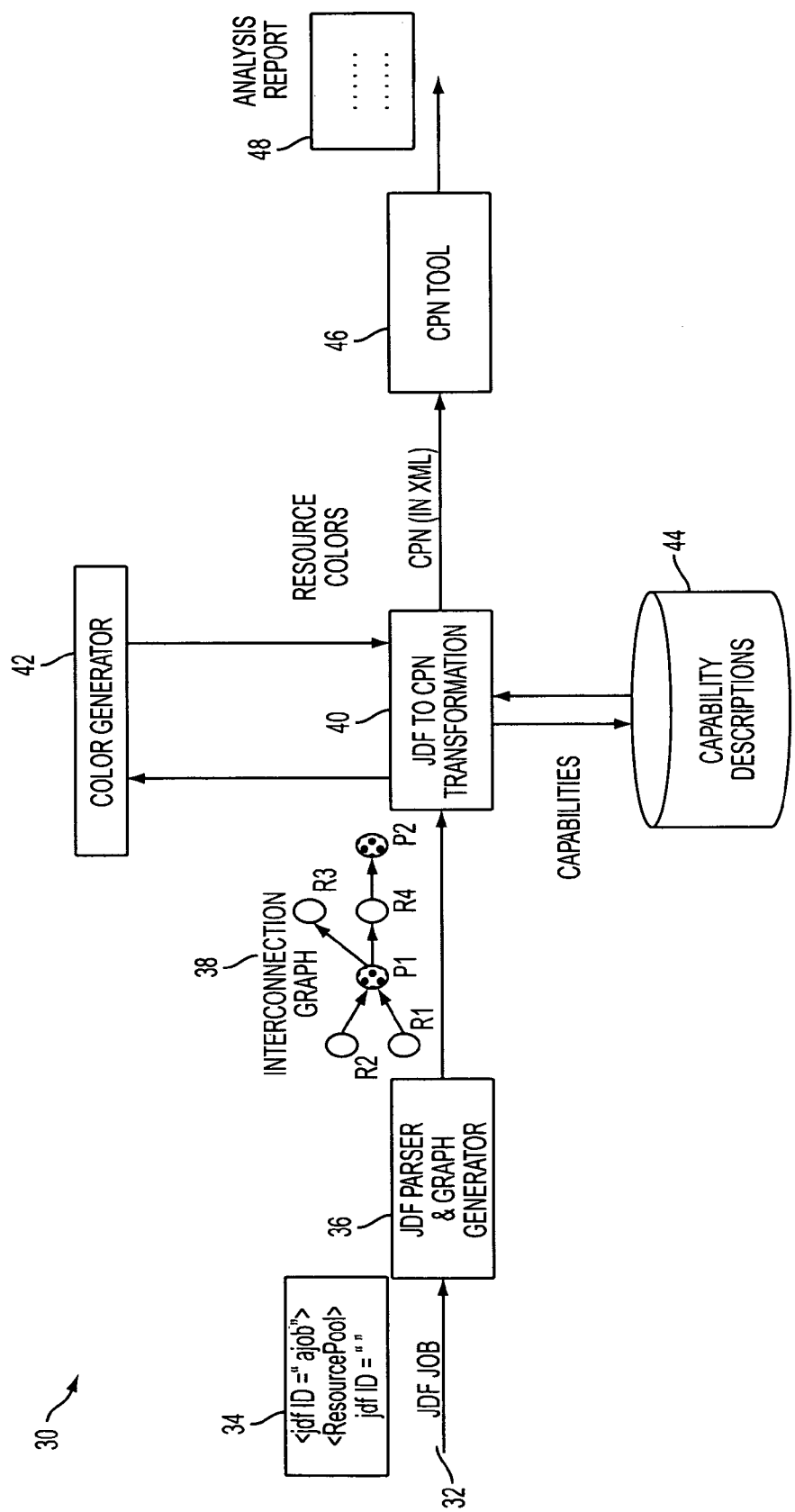
FIG. 6 is a block diagram of a system suitable for implementing aspects of the method outlined in FIG. 5.

FIG. 6 illustrates a block diagram of a system 30 suitable for analyzing a JDF job from a job instance to a complete JDF job with capabilities stored in a knowledge base. FIG. 6 also helps to illustrate the process of transforming a JDF job in XML into a colored Petri net to verify its correctness and do a simulation based analysis of the JDF job. Thus, the following mapping algorithms are required to transform a sample JDF job into a colored Petri net.

Initially, a JDF job 32 having a JDF job example 34 is parsed to determine the resources, processes, and resource process links via a JDF Parser and Graph Generator 36. The JDF job 32 generally consists of three elements involved in its workflow definition, namely the processes, resources and resource attributes. Each process element consists of a set of resources defined as input or output. (Some of the resources are available from the links in the resource link pool.) A process chain (or interconnection graph) 38 of interconnected processes and resources is obtained by iteratively parsing the JDF job 32. The intermediate form could be represented in XML or a data structure such as a graph consisting of two kinds of node objects for processes and resources.

The JDF to colored Petri net transformation is made via a JDF-to-CPN transformer 40. In particular, colors are associated to represent the resources and resource attributes via a Color Generator 42. The resource attributes are of a certain data type. The data types could be simple data types such as integer, string, or Boolean or enumerated data types. An equivalent color for each resource attribute type is calculated. Some of the data types could be directly represented as a color of that type, while some can be combined, or interpreted as a string. In addition to the basic data types, CPN ML supports enumerated, record, list, index, sets, and others.

The resource attribute values are then obtained (i.e., retrieved) along with binding functions from JDF and capability descriptions stored in the knowledge base 44. In a JDF job instance, some of the JDF resource attribute values for processes are available before job execution (indicating resources that are available) and some are computed during run time. In order to analyze and simulate a JDF job, the possible output resource attribute values of a process should be known before hand. The incomplete resource attribute values are obtained from process/device capabilities and the generic procedures stored in the knowledge base 44. For example, the number of pages for a print process is determined based on some input resource attributes and printer capabilities as well as other capability descriptions.

A colored Petri net (in XML) equivalent of resource attribute types, resource types, resource attribute values and processes is then generated via a program such as CPN Tools 46. CPN Tools, which is maintained by the CPN Group, University of Aarhus, Denmark, allows for partial and complete state space analysis. Thus, CPN Tools is a suitable tool for editing, simulating and analyzing colored Petri nets. A colored Petri net equivalent of the JDF job 32 is generated by associating a resource to a particular place type, a process to a transition and interconnections between processes and resources as arcs. Finally, an Analysis Report 48 is generated. The Analysis Report 48 contains the workflow models and associated analysis results in terms of deadlock, reachability, potential bottleneck, etc. Although not shown, the system 30 also includes a graphical user interface (GUI) for receiving user data.

Figure 7:
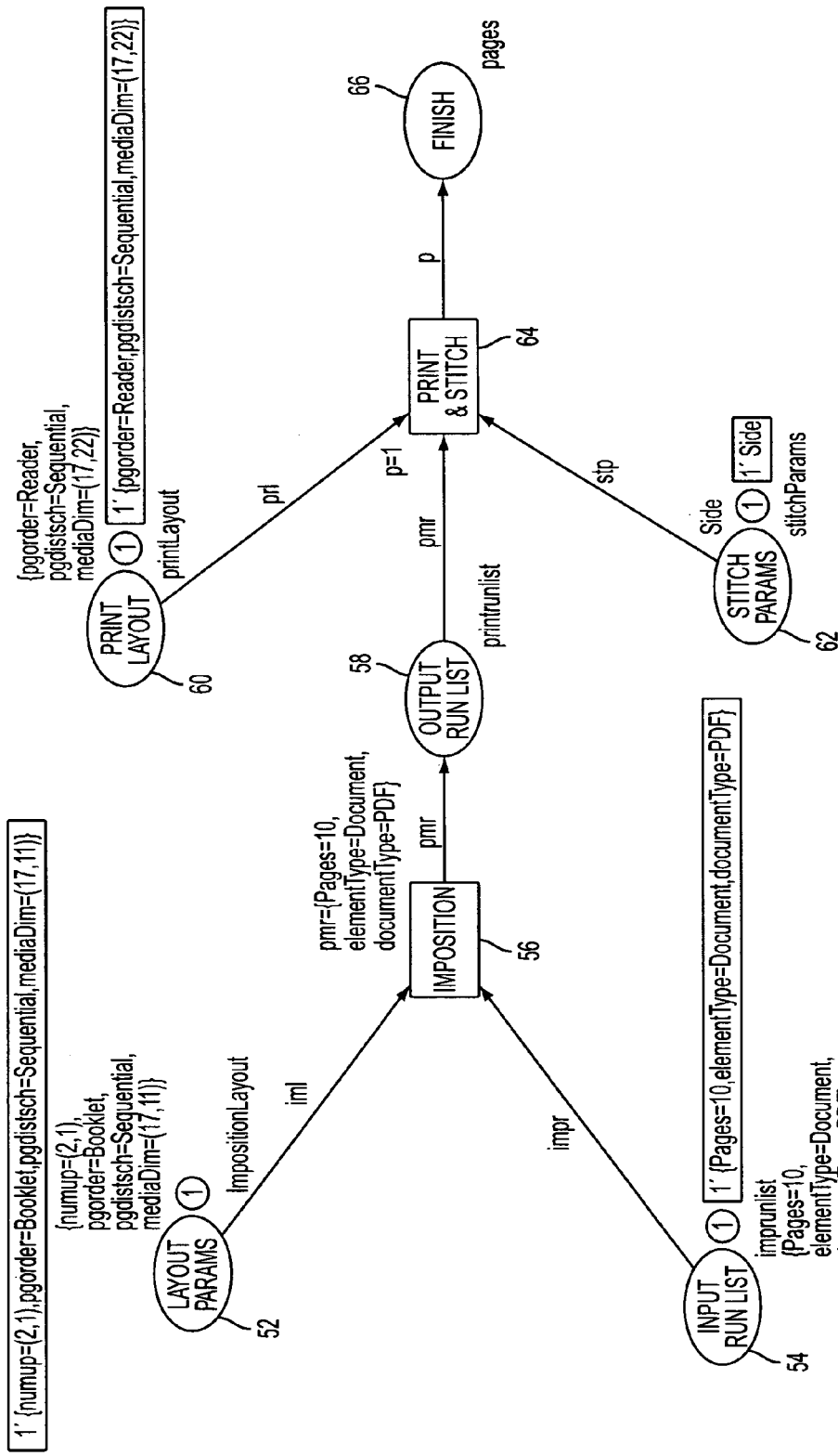
FIG. 7 is a sample saddle stitch JDF scenario represented as a colored Petri net in CPT tools.

FIG. 7 shows a colored Petri net generated from a sample JDF scenario. A colored Petri net (or CPN) is generally defined as an ordered tuple, i.e., CPN=($\Sigma$, P, T, A, N, C, E, M$_0$) where:

$\Sigma$ represents finite non-empty types called color sets;
P is a finite set of places;
T is a finite set of transitions;
A is a finite set of arcs connecting places and transitions;
N is a node function that maps each arc into a pair of nodes of different kinds (i.e., one is a place, while other is a transition);
C is a color function that associates each color with a place;
E is an arc expression that maps each arc into a multi-set over the color set that is attached to the corresponding place; and
M$_0$ is the initial marking.

This equation is essentially a formal definition that describes various components in a colored Petri net. The sections below describe how these various colored Petri net components are used to represent JDF components.

The four core components in the JDF workflow, namely, the processes, resource types, resource attributes and resource attribute values, are to be considered. A resource is represented by a place P and a resource type indicates the color that the place holds. The resource type is a complex data type comprised of the resource attribute types. For example, the resource type printrunlist is represented by the record type which holds types pages, element type and document type. A page is an integer type and elementType and docType are enumerated data types.

An example of a Printrunlist Resource type represented as a colored Petri net is set forth below:

---

Color docType = with PDF|PS
Color elementType = with Document|Surface|PDF
Color pages = INT;

-continued

```
Color printrunlist = record Pages:
    pages*elType=elementType*documentType: docType
```

The token value for the Printrunlist is:

```
1' {Pages=10,elementType=Document,documentType=PDF}
```

In the colored Petri net, a transition T is represented as a process. The process is an active component like a transition that executes on the availability of resources. The input places correspond to the resource types required by the process to execute and the output places correspond to the resource types which are the result after execution of a process. Tokens indicate the availability of a particular resource at a particular place. The number of tokens and token values are changed as they move from one place to another. FIG. 7 shows an example of one token with the attribute values of the place type. The distribution of tokens at various places is called the marking, and a marking denotes the status of resources at that instance.

It may be necessary to arcs model the flow of resources. Arcs connect transitions to places and places to transitions and are represented by arrows. A transition may have input places connected by incoming arcs and output places connected by outgoing arcs. Arcs are used to model the flow of resources; and an arc has a certain data type (resource data type). The default data type would be the data type of the place or transition to which it is connected. For example, with reference to FIG. 7, at 54 the arc transmits imposition runlist data type.

Arcs are of the default type connected to the adjacent places. Also, a function, condition or delay could be associated with arcs, which influence the resource attribute values. Transitions are the binding functions that determine the output resource attribute values from the input resource attribute values. These attribute values are determined from the capability descriptions of a device, some of the attribute values can be evaluated by associating generic procedures to calculate the output resource attribute values, while others are determined directly. For example, based on the service delay and input resources the number of pages could be calculated, where as the output data type is determined directly from the capabilities.

Returning now to FIG. 7, there is shown an example scenario of a colored Petri net for a JDF sample scenario consisting of two processes, namely, Imposition 56 and Print & Stitch 64. Imposition 56 includes two input resources, namely, Layout Params 52 and Input RunList 54 and one output resource, Output RunList 58. Meanwhile, Print & Stitch 64 includes two input resources, namely, Print Layout Params 60 and Stitch Params 62 and one output resource, Finish 66.

A more detailed scenario description is shown below:

```
Imposition
    Input Layout Preparation Params
        NumberUp: (2, 1)
        PageOrder: Booklet
        PageDistributionScheme: Saddle
        Media.Dimension: 17×11
```

-continued

```
    Input RunList(same as FormatConversion output)
        Pages: 10
        ElementType: Document
        DocumentType: PDF
    Output RunList
        Pages: 6
        ElementType: Surface(represents an imposed
            surface
        DocumentType: PDF
Print+Saddle Stitch
    Input Layout Preparation Params
        PageOrder: Reader
        PageDistributionScheme: Sequential
        Media.Dimension: 17×11
    Input Stitching Params
        StitchType: Saddle
    Input RunList (same as Imposition output)
        Pages: 6
        ElementType: Surface
        DocumentType: PDF
```

Resources are represented as places, and the attributes of resource denote the color (data type) that the place holds. CPN Tools, for example, allows declaration of basic data types like int, string, boolean and also complex data types, such as record, enumerated type, and/or list. In the above example, a place denotes a resource type holding various resource attributes. The resource is represented as a complex data type record of other data types (attribute types). A token or marking is the value of this record type. The availability of a resource is indicated by the marking in a token. Firing of a transition indicates the action of a process consuming certain input resources and producing output resources.

For example, in FIG. 7, all the resources for Imposition 56, namely, Layout Params 52 and Input Runlist 54, are available, which indicates that Imposition 56 is ready to occur, whereas the Input Runlist 54 of the printer is dependent on the Output Runlist 58 of the Imposition 56, but two other resources, Print Layout Params 60 and Stitch Params 62, are available.

The colored Petri net representation of the JDF is then analyzed to generate an occurrence graph. The occurrence graph is a directed graph with a node representing a reachable marking and an arc representing the occurring binding element (firing a transition). In other words, an occurrence graph is a directed graph of all the possible states generated in the Petri net for a given marking. The occurrence graph may be generated using CPN Tools. Of course, it is to be understood that other tools may be utilized to analyze the colored Petri net. The GUI is typically based on advanced interaction techniques, such as, for example, toolglasses, marking menus, and bi-manual interaction. Feedback facilities provide contextual error messages and indicate dependency relationships between net elements. The tool features incremental syntax checking and code generation which take place while a net is being constructed. A fast simulator efficiently handles both untimed and timed nets. Full and partial state spaces can be generated and analyzed, and a standard state space report contains information such as boundedness properties and liveliness properties. The functionality of the simulation engine and state space facilities are similar to the corresponding components in Design/CPN, which is a widespread tool for colored Petri nets. CPN Tools generally runs on PCs with hardware support for OpenGL.

Various properties like deadlocks, boundedness, livelocks, etc. are deduced from the occurrence graph generated. A model represented as a Petri net can be analyzed based on the occurrence graph.

Boundedness gives the maximum and minimum number of tokens present at a place in a Petri net. By looking at the boundedness properties, it is possible to determine the resource bottlenecks, waiting times and costs associated with various processes.

Liveliness properties tell whether a certain transition become active during firing. For example, it would be possible to determine deadlocks, if a process does not become enabled at all. A JDF scenario is alive if all the processes could become active.

The colored Petri net could be simulated for specific metrics like cost, throughput, turn around time, etc. CPN Tools allows both analytical and simulation-based approaches to perform simulation.

The capabilities of the processes/devices are obtained from the knowledge base 44. It is possible to associate functions with transitions (processes) in order to calculate metrics. The device capabilities are obtained from the knowledge base 44.

CPN Tools makes use of clocks and token in order to determine the turn around times of jobs, resource waiting times, throughput of the total workflow, etc. A simulation-based assessment of the workflow can be performed by associating random distribution functions to generate attribute values of resources. Some sample metrics include turn around time, throughput, efficiency, resource waiting time and waste.

Turn around time is the time that a job is requested (or submitted) and has completed its operation in the workflow. Time stamps are associated with tokens, and the turn around time for each job is determined by the timestamp value at the final place.

Throughput is the rate at which jobs are processed by a given workflow. It gives the total number of jobs processed for a given unit of time. The number of tokens present at an output place gives the total number of jobs that have been processed for a given time.

Efficiency is the ratio of the maximum achievable throughput to its normal capacity.

Regarding resource waiting time, since tokens are associated with resources, it is possible to determine from the boundedness properties in the occurrence graph how many number of resources are idle for a given device, and what is the total waiting time of the resource.

Waste is the amount of waste produced of a consumable during the execution of a job.

Some of the advantages of the method and system described above include allowing for pre-assessment of a JDF job to check for syntactic correctness in workflow like bottlenecks and deadlocks, enabling both analytical and simulation based performance evaluation of the JDF-based workflow, allowing for an assessment of the JDF-based workflow by some other simulation engine, and reducing the cost, time and effort of manually determining the workflow and analyzing it.

This method and system can be applied to other workflow representations other than JDF. Thus, a similar analysis and simulation could occur, but all references to knowledge bases, rules, and mappings would be specific to the particular workflow of interest.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of assessing a workflow for a print job in Job Definition Format (JDF) prior to execution of the print job, the method comprising:
   (a) programmatically deriving, by one or more computers, the operation semantics of the workflow into a colored Petri net by:
      parsing a JDF print job to determine resources, processes and resource process links for the JDF print job via a JDF parser and graph generator;
      associating colors to represent resources and resource attributes via a color generator, wherein the resource attributes comprise at least one of a plurality of data type, the plurality of data types comprising integers, strings, Boolean, and enumerated data types, and an equivalent color for each resource attribute type is calculated;
      obtaining the resource attribute values and binding functions from the JDF and capability descriptions for the JDF job stored in a knowledge base via a JDF to colored Petri net transformer;
      generating a colored Petri net equivalent of one or more resource attribute types, one or more resource types, one or more resource attribute values and one or more processes associated with the JDF print job via a colored Petri net analyzer by:
         associating a resource to a particular place type, a process to a transition and interconnections between processes and resources as arcs, wherein:
         (i) the arcs connect transition to places and places to transition, (ii) the transitions are the binding functions used to determine the output of resources attribute values from the input resource attribute values, and (iii) attributes of the resources denote the color that the place holds;
   (b) analyzing the colored Petri net workflow to check for syntactic and semantic correctness of the workflow via the colored Petri net analyzer; and
   (c) simulating the colored Petri net workflow for a plurality of performance metrics via a computer, wherein the performance metrics include at least one of cost, throughput, turnaround time, efficiency, resource waiting time, and waste.

2. The method defined in claim 1, wherein the JDF workflow includes a plurality of processes, a plurality of resource types, a plurality of resource attributes, and a plurality of resource attribute values.

3. The method defined in claim 2, further comprising: using CPN Tools to analyze the colored Petri net workflow.

4. The method defined in claim 3, wherein the workflow includes a plurality of processes that are connected sequentially, in parallel, or in iteration.

5. A system for assessing a Job Definition Format (JDF) workflow for a JDF print job prior to execution of the print job, the system comprising:
   a JDF parser and graph generator that parses a JDF print job to determine resources, processes and resource process links for the JDF print job;
   a JDF to colored Petri net transformer that obtains the resource attribute values and binding functions from the JDF and capability descriptions for the JDF job;
   a JDF and capability descriptions database that stores JDF and capability descriptions for the print job;
   a color generator that associates colors to represent resources and resource attributes and calculates an equivalent color for each resource attribute type, wherein the resource attributes comprise at least one of a plurality of data type, the plurality of data types comprising integers, strings, Boolean, and enumerated data types;

a colored Petri net analyzer that generates a colored Petri net equivalent workflow of one or more resource attribute types, one or more resource types, one or more resource attribute values and one or more processes associated with the JDF print job by:

associating a resource to a particular place type, a process to a transition and interconnections between processes and resources as arcs, wherein:

(i) the arcs connect transition to places and places to transition, (ii) the transitions are the binding functions used to determine the output of resources attribute values from the input resource attribute values, and (iii) attributes of the resources denote the color that the place holds;

the colored Petri net analyzer that analyzes the colored Petri net workflow to check for syntactic and semantic correctness of the workflow;

a simulator for simulating the colored Petri net workflow for a plurality of performance metrics, wherein the performance metrics include at least one of cost, throughput, turnaround time, efficiency, resource waiting time, and waste; and wherein at least one of the JDF parser, graph generator, JDF to colored Petri net transformer, color generator, colored Petri net analyzer, and simulator is a computer processing device.

6. The system defined in claim 5, further comprising a graphical user interface for receiving user data.

7. The system defined in claim 6, wherein the colored Petri net analyzer comprises CPN Tools.

8. The system defined in claim 7, wherein the workflow includes a plurality of processes that are connected sequentially, in parallel, or in iteration.

9. The system defined in claim 8, wherein the JDF workflow includes a plurality of processes, a plurality of resource types, a plurality of resource attributes, and a plurality of resource attribute values.

* * * * *